US009836756B2

(12) United States Patent
Rider et al.

(10) Patent No.: US 9,836,756 B2
(45) Date of Patent: Dec. 5, 2017

(54) EMOTIONAL ENGAGEMENT DETECTOR (71) Applicant: Intel Corporation, Santa Clara, CA (US)

(72) Inventors: Tomer Rider, Naahryia (IL); Hong Li, El Dorado Hills, CA (US); Rita H. Wouhaybi, Portland, OR (US); Igor Tatourian, Fountain Hills, AZ (US); Igor Ljubuncic, Chiswick London (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/749,097

(22) Filed: Jun. 24, 2015

(65) Prior Publication Data
US 2016/0379225 A1 Dec. 29, 2016

(51) Int. Cl.
*G06Q 30/02* (2012.01)
*G10L 25/63* (2013.01)
*G06K 9/00* (2006.01)

(52) U.S. Cl.
CPC ....... *G06Q 30/0201* (2013.01); *G06K 9/0061* (2013.01); *G06K 9/00248* (2013.01); *G06K 9/00281* (2013.01); *G06K 9/00302* (2013.01); *G06K 9/00369* (2013.01); *G06K 9/00778* (2013.01); *G10L 25/63* (2013.01)

(58) Field of Classification Search
CPC ........... G06K 9/00315; G06K 9/00281; G06K 9/00221; G06K 9/00597; G06K 9/00335; G06K 9/00248; G06K 9/00268; G06K 9/00302; G06K 2009/3291; G06K 9/78; G06Q 30/02; G06Q 30/0201; G06Q 10/087; G06Q 30/0601; G06Q 30/0641; G06Q 10/0639; G06Q 30/00; G06Q 30/016; G06Q 30/0631; G06Q 30/0627; G06Q 30/0241; G06Q 30/0202; G06Q 30/0207; G06Q 30/0211; G06Q 30/0224; G06T 2207/10016; G06T 7/2093; G06T 7/0042; H04N 21/485; H04N 5/23219; A61B 5/165
See application file for complete search history.

(56) References Cited

U.S. PATENT DOCUMENTS 6,571,216 B1 * 5/2003 Garg ...................... G06Q 30/02
705/14.25
8,219,438 B1 * 7/2012 Moon ................ G06Q 30/0201
705/7.29

(Continued)

*Primary Examiner* — Kim Vu
*Assistant Examiner* — Michael Vanchy, Jr.
(74) *Attorney, Agent, or Firm* — Schwegman Lundberg & Woessner, P.A.

(57) ABSTRACT

Various systems and methods for tracking and analyzing emotional engagement of people while shopping are described herein. A system for tracking and analyzing emotional engagement of people while shopping includes an image processing module to: access image data from an electronic data storage, the image data including a person in a retail environment; and detect the person in the image data; an emotion detection module to determine an emotion expressed by the person; an object detection module to determine an object with which the person is interacting; and a marketing module to: select a sales action based on the emotion and the object; and execute the sales action.

25 Claims, 5 Drawing Sheets

(56) References Cited

U.S. PATENT DOCUMENTS

| | | | | |
|---|---|---|---|---|
| 2008/0091515 A1* | 4/2008 | Thieberger | ........... | G06Q 10/063 705/7.11 |
| 2011/0294566 A1* | 12/2011 | Cardno | ............... | G07F 17/3237 463/25 |
| 2013/0266925 A1* | 10/2013 | Nunamaker, Jr. | .... | G06N 99/005 434/362 |

* cited by examiner

EMOTIONAL ENGAGEMENT DETECTOR

TECHNICAL FIELD

Embodiments described herein generally relate to environmental sensors and behavior analysis and in particular, to a system for tracking and analyzing emotional engagement of people while shopping.

BACKGROUND

Market research refers to an organized effort to gather information about target markets or customers. Market research includes analyzing market information, market segmentation, market trends, and marketing effectiveness. Market research is an important part of a company's business strategy and is a key factor to maintain competitiveness over others in the market. Much of market research is performed by conducting consumer surveys and focus groups, gross sales analyses, and advertising research and analysis.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The present disclosure discusses an improvement to the general field of market research. In the past, market research was typically conducted with consumer surveys, focus groups, or analyzing sales. These methods failed to account for the consumer at or just before the point-of-sale. The systems and methods described herein provide a system for tracking and analyzing emotional engagement of people while they are shopping. This emotional engagement may be used to provide qualitative or quantitative input for market research.

When consumers shop in a brick-and-mortar retail environment, they may exhibit one of two shopping modes: focused or discovery. In a focused shopping mode, the consumer has a preconceived idea of what product the consumer is interested in and moves directly to an area, such as a shelf or aisle that has that product. In a discovery shopping mode, the consumer is browsing and open to new products. In the past, technology was limited or unavailable and consequently, information about consumers while shopping in this mode was unobtainable. However, producers are deeply interested in capturing, analyzing, and understanding consumer behavior during this discovery mode. With such information, product placement on retail shelves, product offerings, pricing, and other marketing aspects may be fine-tuned. Note that a consumer might change between focused and discovery modes in one shopping trip.

The systems and methods disclosed detect engagement of a customer with a product using image-based gaze detection, emotion recognition, and contextual inputs. Using the aggregating information to reconstruct emotional highs and lows of a customer while shopping helps retailers and manufacturers to improve the overall shopping experience. Retailers and manufacturers may gain insights into why a customer does not buy a particular product, whether there was engagement with their product or a competitor's product, how long a customer stood in front of their product or shelf with their product, and other contextual information. The systems and methods maybe applied to a variety of retail settings, such as grocery stores, appliance stores, garment stores, warehouses, etc.

Figure 1:
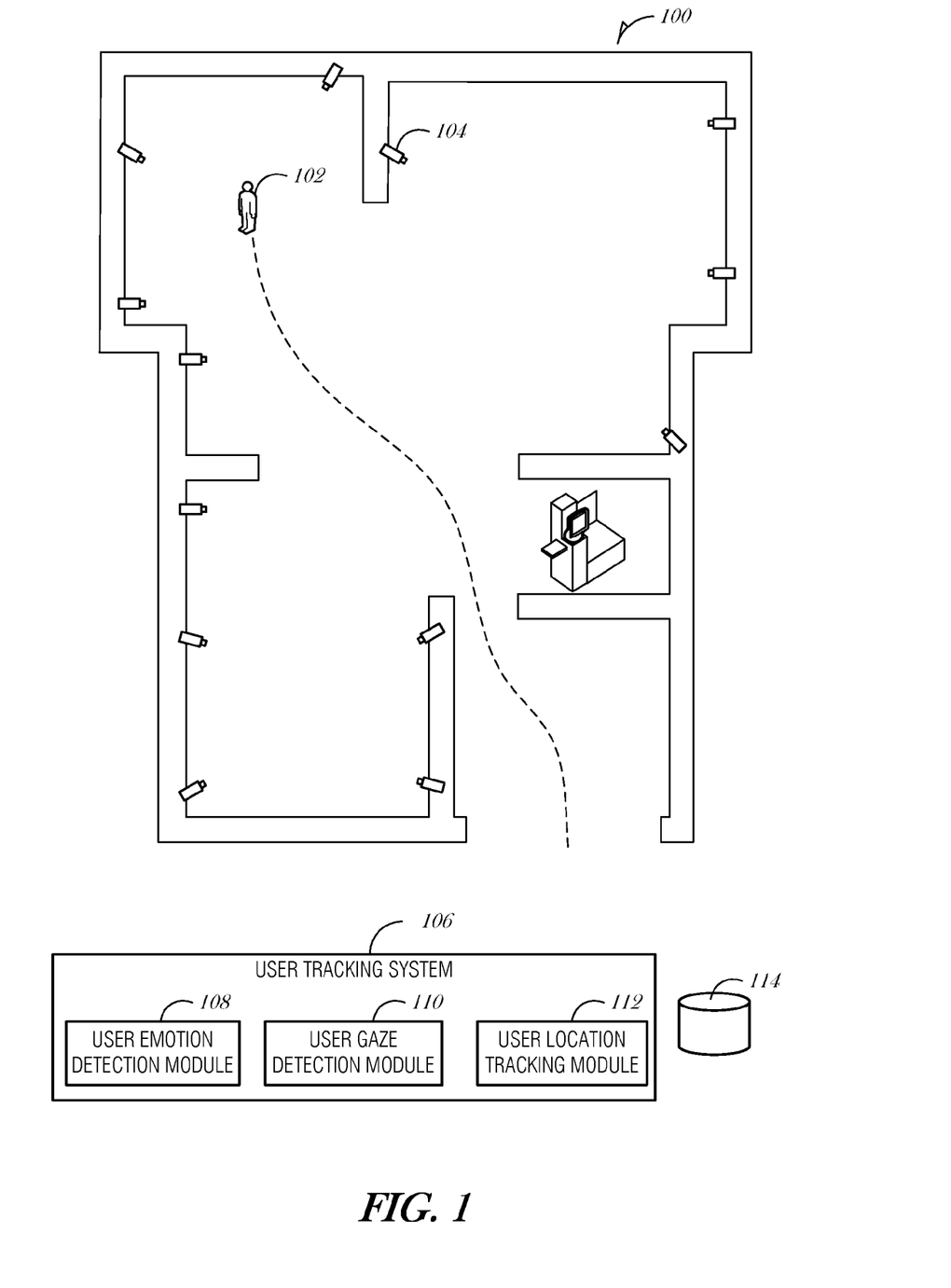
FIG. 1 is a diagram illustrating a shopping environment, according to an embodiment.

FIG. 1 is a diagram illustrating a shopping environment 100, according to an embodiment. FIG. 1 includes a user 102 (e.g., shopper, consumer, client, or customer) who moves about the shopping environment 100. A camera system tracks the user 102 as he moves. The camera system may include one or more cameras 104 to capture the user's movement, facial expressions, head pose, eye gaze, body posture, body language, and other aspects of the user 102 as the user 102 browses merchandise in the shopping environment 100. The camera system may include infrared cameras, which may be used to track eye gaze by reflecting infrared light off of the user's eye and capturing the reflect light using an optical sensor in the infrared camera to determine eye rotation or position. Information related to the user's movement, expressions, eye tracking, etc. may be transmitted to a user tracking system 106.

The user tracking system 106 may be hosted at the shopping environment 100 or remote from the shopping environment 100 (e.g., as a cloud-based application). The user tracking system 106 is used to process the video images and other information obtained by the camera system. The user tracking system 106 may include various components, such as a user emotion detection module 108, a user gaze detection module 110, and a user location tracking module 112.

The user emotion detection module 108 may receive as inputs video or audio information. The video information may be captured by one or more cameras in the camera system. The audio information may be captured by microphones integrated into the cameras or from separate, stand-alone microphones. The user emotion detection module 108 may analyze one or more images from the video information to identify or infer user emotions. The user emotion detection module 108 may identify and analyze a user's face to determine potential emotions while the user 102 is browsing a certain product or viewing a display. Alternatively or in addition to, the user emotion detection module 108 may analyze a body posture or sequence of body postures from one or more images to determine or identify an expressed emotion. Audio information may also be used separately or in combination with video information to separately identify an emotion or strengthen an inference of an emotion detected using video/image analysis. For example, based on video analysis, a user 102 that picks up a product from a shelf, frowns, and then places the product back on the shelf abruptly may be associated with one or more emotions, such as disgust, frustration, or anger. Audio analysis may capture and identify the user 102 sighing, grunting, or muttering the word "junk" may reinforce the initial emotional classification of disgust.

The user gaze detection module 110 may identify and track a user's gaze while the user 102 is moving about the shopping environment 100. The user gaze detection module 110 may identify products, shelves, advertising displays, or other objects that capture the user's gaze and store an association between the object that the user 102 viewed and metrics about the gaze, such as length of gaze, whether the user 102 looked away and then looked back, or whether the user 102 appeared to be reading portions of the object (e.g., reading an ingredient list on the back of a cereal box). The user gaze detection module 110 may interface with one or more user devices, such as wearable devices (e.g., smart-glasses), that are able to track the user's gaze locally and then provide gaze information to the user gaze detection module 110.

The information and inferences stored and created by the user gaze detection module 110 may be combined with information or inferences stored or created by other modules in the user tracking system 106. For example, the user gaze detection module 110 may be used to reinforce an emotion identified by the user emotion detection module 108. As another example, the user tracking system 106 may track a user 102 over time using multiple modules, such as by using the user gaze detection module 110 to detect an initial interest in an object, and then identify that the user 102 viewed a specific portion of the object (e.g., ingredient list), and then identify that the user 102 exhibited disgust based on image/video analysis from the user emotion detection module 108. By tracking user activity, an advertiser, producer, store owner, or other interested party may obtain marketing intelligence about the product, such as whether people are attracted to or put off by an image on the product label, content of the product label, product placement on shelves, or other aspects of product presentation.

The user location tracking module 112 may use cameras, Wi-Fi trilateration, GPS, or other inputs or mechanisms to track the movement of the user 102 about the shopping environment 100. The user's path through the shopping environment 100 may provide insight into how the user 102 shops, whether the user 102 is attracted to displays that take them off of an anticipated path, whether the user 102 is shopping with other people, follows a group or another person, or shops alone, and other information. When a user 102 is shopping with a group (e.g., a family), the paths of each of the members of the group may be tracked and analyzed.

The user tracking system 106 allows a retailer or other related party to track body language, gaze characteristics, facial emotions, and audible feedback of patrons in order to profile products and the responses that they evoke. Using various inputs such as facial expressions, audible emotions, gaze, group shopping dynamics, interactions with products (e.g., physical interactions, picked up product, scanned barcode, read ingredients, tried product on for size, etc.), detection of interest in similar products (e.g., user performed same actions with competing boxes and bought one of the competing boxes), change of body language in aisle (e.g., walked slower, walked faster, parked the cart so that they can take time looking, etc.), gaze duration, shopping and personal history analysis, and other analytics, the user tracking system 106 may be used to understand a user's shopping behavior and context, identify individual's behavior and paths, and capture emotional responses to provide actionable feedback to manufacturers and retailers. While the user tracking system 106 may be used in an anonymized fashion, such as by aggregating shoppers and looking at statistical trends correlating to user's demographics and characteristics, the user tracking system 106 may also be used to provide personalized offers (e.g., ads, coupons, rewards points, feedback opportunities, etc.) if the user opts in.

Another aspect of the user tracking system 106 is that the retailer, marketing personnel, or other party may use real time emotion analysis of user interaction with the store and products, capture small hints of satisfaction or dissatisfaction with a product, a display, or other aspects of the shopping experience, and construct how a user's mood changes as they walk through the store. Groups of shoppers may be anonymized and summarized to obtain statistical measurements. Using the output from this type of analysis, the retailer, marketing personnel, or others may provide coupons, sales, or other incentives to manage shoppers' experience and drive sales or even change product placement and store layout.

As one example, a user 102 may be tracked as they walk through a store (e.g., shopping environment 100). The user 102 may stop at a display and pick up an item (e.g., a bottle of shampoo), inspect the item for several seconds, and then place the item back on the shelf. During the interaction, the user's body language, facial expressions, or utterances may be analyzed to determine that the user 102 began the interaction with a neutral mood and ended the interaction with a negative mood. In an effort to capture a sale, the user 102 may be presented with an offer for the item or a competing or alternative item. For example, the user 102 may be provided with a 5% off coupon to incentivize the user 102 to purchase the item. The coupon may be presented to the user 102 via a user device (e.g., a smartphone) that the user is wearing or carrying.

A map of the shopping environment 100 may be constructed and maintained to associate user moods and emotional reactions with areas of the shopping environment 100, shelves or racks of items, or even individual items. An inventory database 114 may be populated with merchandise available at the shopping environment 100. The inventory database 114 may also include metrics derived or determined from the user tracking system 106, such as emotional responses of patrons, with such metrics associated with various data in the inventor database 114. For example, a database relationship may be created between merchandise and most frequently observed emotional response or responses. The emotional response may be further classified by the context of the customers such as demographics data, in a hurry, accompanied by minors, etc. Another database relationship may be created between the type of merchandise and the emotional response(s), the manufacturer of the merchandise, the price of the merchandise, or other aspects of the merchandise and observed emotional response(s). The inventory database 114 may also include merchandise that is not presently offered for sale in the shopping environment 114, such as seasonal products, out of stock products, or discontinued products.

Using the inventory database 114 and the user tracking system 106, a time-based map may be created that illustrates how changing product configurations, placements, or availability may affect emotions of patrons and whether there are clusters where happy emotions and better sales correlate.

Other marketing intelligence may be obtained or derived from the data in the inventory database 114 and the user tracking system 106.

Figure 2:
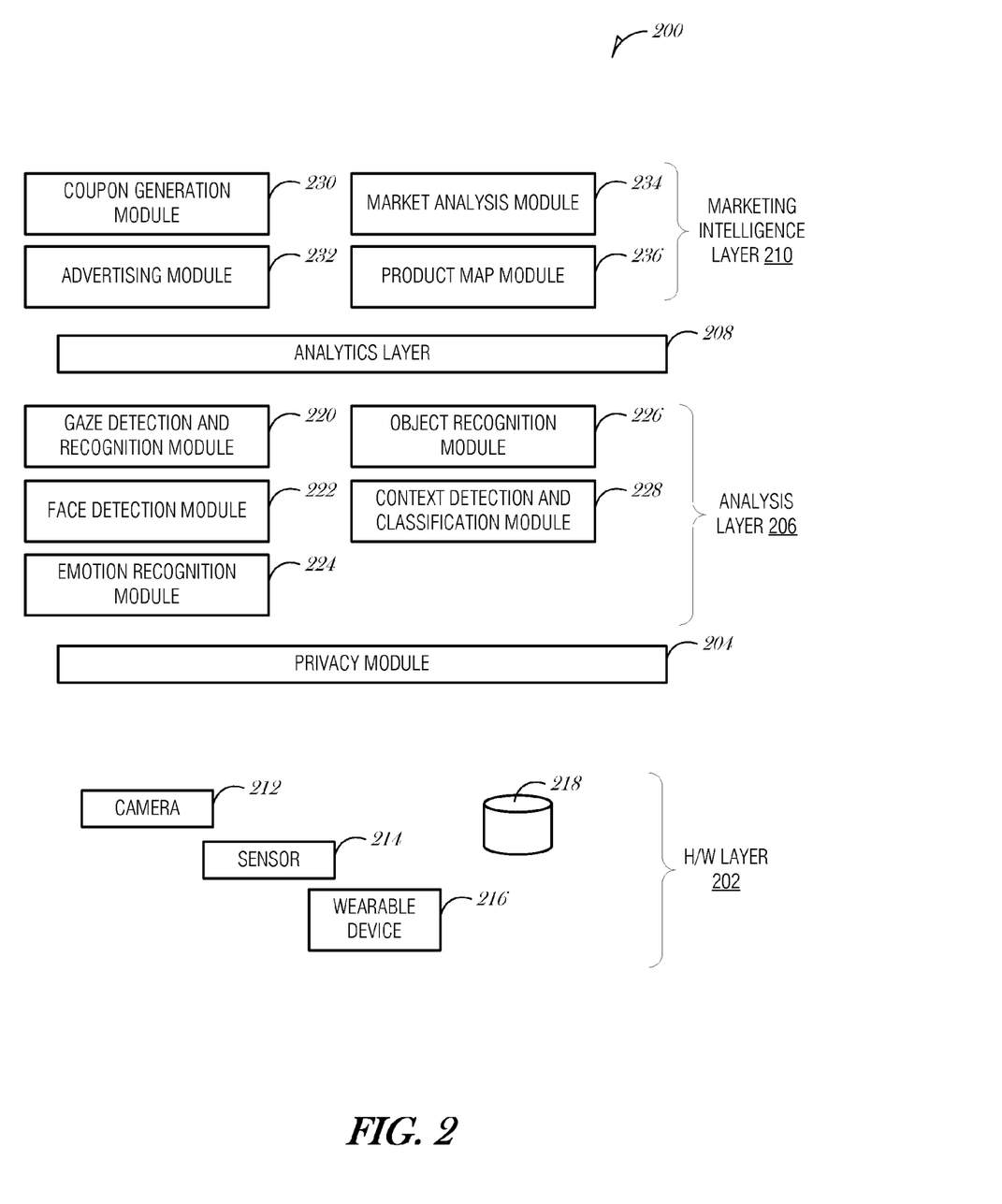
FIG. 2 is a block diagram illustrating an architecture of a user tracking system, according to an embodiment.

FIG. 2 is a block diagram illustrating an architecture 200 of a user tracking system 106, according to an embodiment. The architecture 200 includes a hardware layer 202, a privacy module 204, an analysis layer 206, an analytics layer 208, and marketing intelligence layer 210. The hardware layer 202 includes various hardware components that sense or detect input and store data. The hardware layer 202 includes one or more cameras 212, sensors 214 (e.g., IR sensors, motion detectors, etc.), wearable devices 216, and a database 218. Although only some components are illustrated in the hardware layer 202 of FIG. 2, it is understood that more or fewer components may be implemented (e.g., omitting IR sensors or increasing the number of databases). The cameras 212 and sensors 214 may be used to determine and identify the mood, emotion, or other mental state of a shopper. The wearable devices 216 may be used by the shopper and may be provided by the store or a personal device of the shopper. When the wearable device 216 is a personal device, the shopper may have to install an app to allow the store to access the wearable device 216, change permissions on the wearable device 216, or otherwise configure the wearable device 216 to work within the store.

The privacy module 204 may be used to anonymize the shopper's activities. The privacy module may aggregate data instead of linking it to a particular individual. For example, the privacy module 204 may indicate that men under the age of 35 seem to have a positive emotional reaction to products highlighting carbohydrates while women in the same age range appear to inspect the nutritional data and the ingredients list more closely. As another example, the privacy module 204 may classify differences of the clientele of a chain store in a poor area versus an affluent one. Neither of these examples identify an individual. The privacy module 204 may temporarily store identification information, for example, to avoid double counting a person's behavior. The privacy module 204 protects the identities of shoppers without skewing the data.

The analysis layer 206 includes various applications, hardware, or other systems that receive the input from the cameras 212 and sensors 214 and perform analysis on such input. The analysis layer 206 includes a gaze detection and recognition module 220, a face detection module 222, an emotion recognition module 224, an object recognition module 226, and a context detection and classification module 228. It is understood that more or fewer modules may be used in any specific implementation. The gaze detection and recognition module 220 is configured to receive images from the cameras 212 or data from the sensors 214 (e.g., infrared eye tracking data) to determine where and for how long a shopper's gaze is held on or near an object. The gaze detection and recognition module 220 may work in conjunction with the face detection module 222, the object recognition module 226, or the context detection and classification module 228 in various embodiments.

The face detection module 222 is configured to receive image data from the cameras 212 and detect faces in the images. The face detection module 222 may segment the detected faces, such as by cropping the image. The detected faces may be used as input to the emotion recognition module 224.

The emotion recognition module 224 may receive faces detected by the face detection module 222 and analyze the facial expressions to determine a person's mood or emotion.

The emotion recognition module 224 may also or alternatively receive input from the cameras 212, sensors 214, or wearable devices 216 to determine emotion. For example, the shopper may be using a wrist-based wearable device that is capable of sensing and recording the shopper's heart rate, skin temperature, or blood pressure. The biometric information may be used to identify or strengthen an inference of a particular emotion. As another example, images from the cameras 212 may be analyzed to determine the shopper's body posture, walking pace, or other actions to identify or strengthen an inference of a particular emotion. Sensors 214, such as a heart rate monitor, infrared heat monitor, or other biometric detection sensor may be used to identify or strengthen an inference of a particular emotion (e.g., a person's body temperature increases when the person is angry, or a person's heart rate increases when excited or enthusiastic, etc.).

The object recognition module 226 is configured to receive image input from the cameras 212 and identify one or more objects of interest. The objects of interests may be products that the shopper has recently interacted with or is currently interacting with. Object recognition may use various image analysis techniques, such as edge matching, greyscale matching, or gradient matching. The object recognition module 226 may learn over time with a user feedback loop.

The context detection and classification module 228 is configured to use data from the cameras 212, sensors 214, or wearable device 216 to identify the context of a shopper's experience. For example, when a shopper is identified as shopping with several other people, the context may be classified as a "group shopping event." Alternatively, when a shopper is identified as shopping alone, the context may be classified as a "solo shopping event." Other contexts may be identified, such as when shopping alone, with an adult, with a minor (sometimes the purchase is done to entertain a child), when in a hurry, when in a browsing mode of shopping, time of day, day of week, number of products already in cart, etc. Other examples may include things like if the user has many gadgets on them (wearables, latest in smartphones, smart watch).

The analytics layer 208 gathers data from various modules (e.g., gaze detection and recognition module 222, emotion recognition module 224, or context detection and classification module 228) and aggregates and compiles the data to provide output via the marketing intelligence layer 210. The analytics layer 208 provides support for the applications and work product produced in the marketing intelligence layer 210.

The marketing intelligence layer 210 includes a coupon generation module 230, an advertising module 232, a market analysis module 234, and a product map module 236. The coupon generation module 230 may receive input from the analytics layer 208 that indicate the popularity or unpopularity of certain products, buying habits of shoppers, or the like. Using this information, the coupon generation module 230 may access a coupon offer database to determine which offers are available to present to shoppers. Offers may be available based on various factors, such as the time of year (e.g., seasonal discounts), holiday (e.g., holiday discounts), the shopper's identity, demographics, or classification (e.g., personalized offers), manufacturer incentives, and the like. Coupons may be provided with a limited valid time period, such as during the current shopping trip, for the remainder of the current day (the day the coupon was presented to the shopper), or other time constraints. The coupon may be presented to the shopper using various mechanisms, such as with a direct communication (e.g., email or text message to a smartphone) or indirect communication (e.g., with an announcement over a public address system in the store).

Closely related to coupon presentation is advertising. The advertising module 232 may generate, serve, or track advertisements. The advertisements may be provided to shoppers while the shopper is shopping. Which advertisements are presented may be based on the products that the shopper has recently or previously interacted with during the current shopping trip or an early one, or products in their cart. For example, when a shopper picks up and looks at taco shells, an advertisement for taco sauce may be served to the shopper on the shopper's wearable device.

The market analysis module 234 may be used to gather, collate, coordinate, summarize, report, and otherwise provide marketing insights. The marketing analysis module 234 may be provided to several stores within a given franchise (e.g., several locations of a grocery store chain) or across several different unrelated, but similar stores. Manufacturers may be provided reports on shopper behavior, such as detail of how people react to their products (e.g., 40% walk past it or 30% that pick up the product, put it back on the shelf), or how people react to in-store advertising or coupon programs for their products.

The product map module 236 may be used to generate a heat map of the store to indicate emotions experienced by patrons in different areas of the store. The heat map may be color coded (e.g., red for unhappy emotions, blue for neutral emotions, and yellow for happy emotions). Various user interface controls may be used on the heat map to zoom into certain sections of the store map, filter on emotions, generate reports, or the like. Heat maps may be generated on a periodic or regular basis, such as weekly, to show aggregate emotions during the period. Heat maps may also be analyzed over time to see how changing product offerings, coupons, sales, prices, arrangement, or other aspects of presentation or marketing may affect emotions of the patrons.

The various modules in the marketing intelligence layer 210 may interact and work together. For example, coupons may be generated by the coupon generation module 230 based on the market analysis performed by the market analysis module 234 or the heat map produced by the product map module 236. Conversely, coupon performance may be tracked and correlated to the product map module 236 to determine whether product placement affects coupon performance or use.

Figure 3:
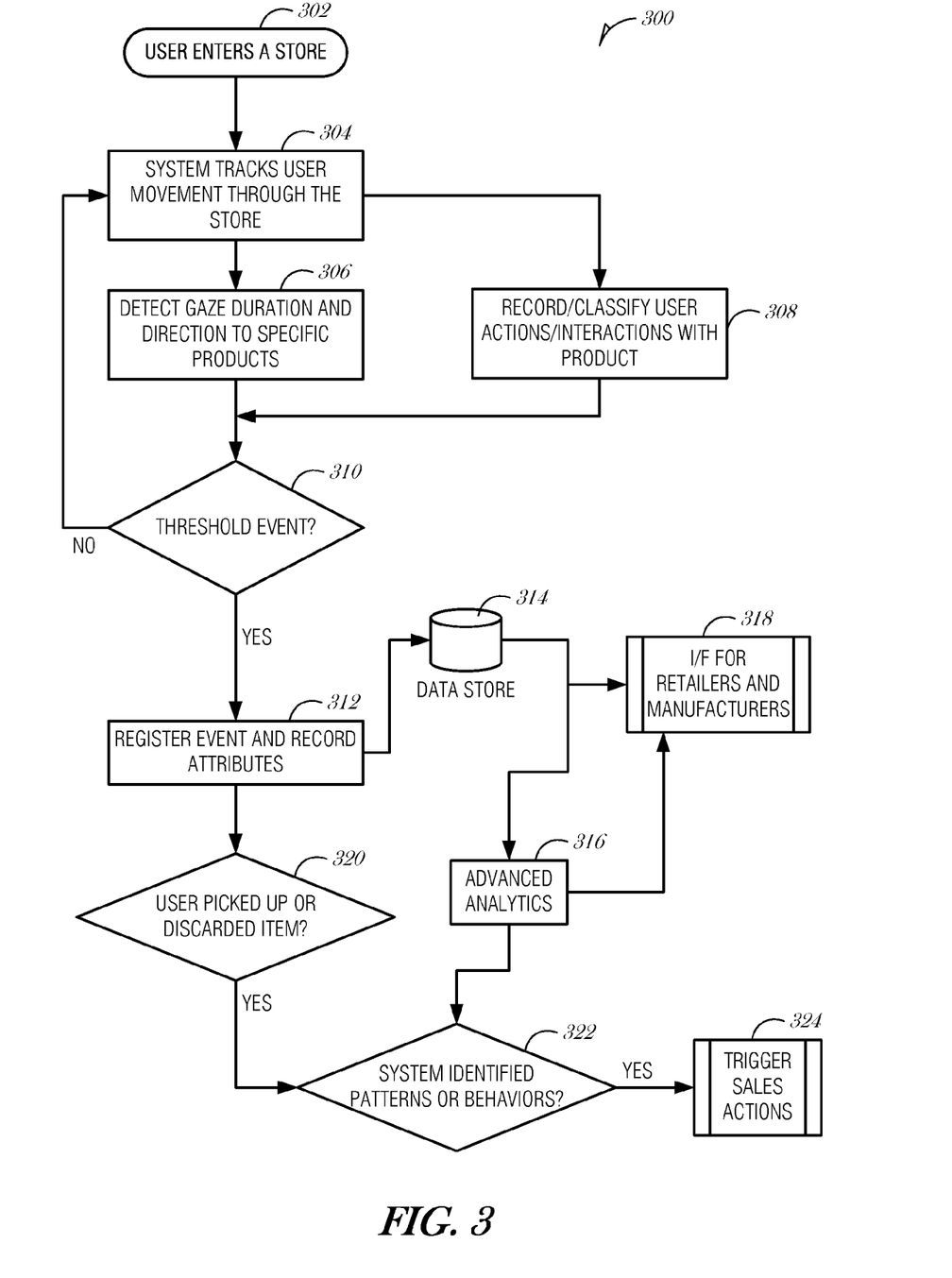
FIG. 3 is a flowchart illustrating control and data flow during operation, according to an embodiment.

FIG. 3 is a flowchart illustrating control and data flow 300 during operation, according to an embodiment. At state 302, a user enters a store. The store may be an indoor or outdoor environment, such as a department store or a farmers market, respectively. As the user moves throughout the store, the user's movements are tracked (operation 304). The user's gaze duration and direction are tracked (operation 306) and the user's actions (e.g., posture, picking up a product, etc.) are tracked (operation 308) while the user is at the store. When a threshold event is identified (operation 310), then additional processing is performed. Otherwise, monitoring continues at operation 304.

Threshold events detected at operation 310 include actions such as a user stopping at a display, picking up one or more product, putting a product back, putting a product in a cart, carrying the product off, trying the product on (e.g., trying on a hat for fit and style), comparing two or more products, inspecting a product, or the like. Threshold events may be defined by an administrative user, such as the store owner, the system provider, or a manufacturer.

When a threshold event is detected at operation 310, the event is recorded (operation 312). Various event details may be recorded, such as the type of event, time of event, product or products involved with the event, duration of gaze, gender of user, emotion or emotions detected as the user interacts with the product, etc. The event details are recorded in the data store 314. The data store 314 may store events from one or more stores and may be drawn on to generate reports, marketing material, coupons, etc. Advanced analytics (operation 316) may be performed on the data stored at the data store 314. The results of the advanced analytics may be used to drive sales actions. Additionally, the information from the data store 314 and the results of the advanced analytics 316 may be provided to retailers, manufacturers, marketers, etc. (stage 318).

As an example of processing a threshold event, when a user picks up or puts down an item (operation 320), the system identifies behaviors or patterns of the users' actions, emotions, product placement, and other aspects of the product presentation and the user interaction (operation 322). Based on the identified patterns or behaviors, one or more sales actions may be triggered (stage 324). Examples of sale actions include generating or serving advertisements, coupons, or other incentives.

Figure 4:
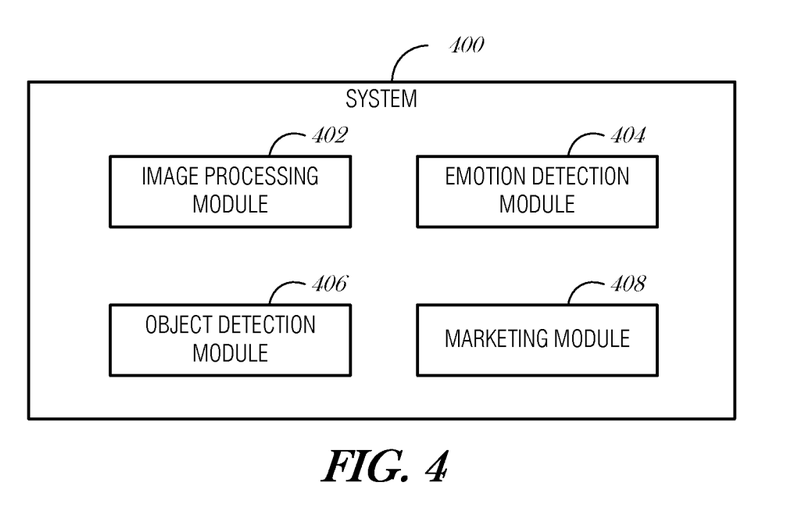
FIG. 4 is a block diagram illustrating a system for analyzing emotional engagement of people while shopping, according to an embodiment.

FIG. 4 is a block diagram illustrating a system 400 for analyzing emotional engagement of people while shopping, according to an embodiment. The system 400 may include an image processing module 402, an emotion detection module 404, an object detection module 406, and a marketing module 408. The image processing module 402 may be configured to access image data from an electronic data storage, the image data including a person in a retail environment and detect the person in the image data. The emotion detection module 404 may be configured to determine an emotion expressed by the person. The object detection module 406 may be configured to determine an object with which the person is interacting. The marketing module 408 may be configured to select a sales action based on the emotion and the object and execute the sales action.

In an embodiment, the image data is from multiple images of the person. In a further embodiment, the multiple images are from multiple angles. For example, multiple cameras may capture the person substantially concurrently from different views. The person's body language, posture, or other activity may be composited from the several angles to provide a more accurate image representation for analysis.

In a further embodiment, the multiple images are from a sequence of images during an interaction between the person and the object. For example, the person's actions may be tracked over time using several images, which may be sequential images from a video feed, for example. The person's movements may be then more readily discerned from the multiple images.

In an embodiment, to detect the person in the image data, the image processing module 402 is to use an edge detection technique to identify a face and use a person detection technique to detect the person in the image. Various person detection techniques may be used. For example, the person detection technique may be a generative process where detected parts of the human body are combined according to a previously-known human model. As another example, the person detection technique may use silhouettes and perform tracking using stochastic search in high-dimensional spaces. As yet another example, using statistical analysis that combine a set of low-level features within a detection window may be used to classify the window as containing a person.

One example is using grids of Histograms of Oriented Gradient (HOG) descriptors for human detection.

In an embodiment, to determine the emotion expressed by the person, the emotion detection module 404 is to analyze the image data of the person and identify a facial expression and identify the emotion expressed based on the facial expression.

In an embodiment, to determine the emotion expressed by the person, the emotion detection module 404 is to analyze the image data of the person and identify a body posture and identify the emotion expressed based on the body posture.

In an embodiment, the emotion detection module 404 is to receive data related to the gaze characteristics of the person and use the gaze characteristics to determine a gaze target invoking the emotion expressed by the person. In a further embodiment, the data related to the gaze characteristics includes gaze tracking data received from an infrared camera. The gaze target may be various things, such as a product, a product display, an advertisement, a floor model, or the like.

In an embodiment, the emotion detection module 404 is to receive audio data of the person and use the audio data to determine the emotion expressed by the person. In a further embodiment, the audio data includes an utterance of the person. For example, the person may utter "wow" when inspecting an item, which may be associated with the action of the person putting the item in their cart, the resulting detected emotion then being identified as surprise, happiness, or delight. The utterance may be non-verbal, such as a grunt, a hum, or a whistle. Different utterances, either verbal or non-verbal, may be mapped to emotional responses and used to refine a likely emotional response finding or as a basis for an emotional response finding.

Biometric analysis may be used to separately detect a person's emotional state or used in combination with other factors (e.g., body posture) to strengthen a finding of an emotional state or expressed emotion. In an embodiment, the emotion detection module 404 is to receive data from a user device of the person and use the data from the user device to determine the emotion expressed by the person. In a further embodiment, the data from the user device comprises heart rate data of the person. In another embodiment, the data from the user device comprises skin temperature data of the person. In another embodiment, the data from the user device comprises blood pressure data of the person.

In an embodiment, to determine the object with which the person is interacting, the object detection module 406 is to use an edge detection technique to obtain a silhouette of the object and match the silhouette of the object with an object template. In an embodiment, to determine the object with which the person is interacting, the object detection module 406 is to use a text recognition technique to recognize text on the object and perform a lookup in a text dictionary to identify the object based on the text. For example, a box of cereal may have a distinctive coloring, text, or logo. From image analysis, the name of the cereal may be identified. Alternatively, the shape of the product may be distinctive. Any of these properties may be used to identify the object.

In an embodiment, to select the sales action based on the emotion and the object, the marketing module 408 is to determine that the person discarded the object and identify an incentive for the person based on the object. In an embodiment, the incentive may be offered when the person is determined to have considered an alternative or competing product. In a further embodiment, the incentive is one of a coupon or a promotion. Coupons are typically used by a consumer to reduce an effective price of a product by either a percentage discount, value discount, or some discount on multiple items (e.g., two for one special). Promotions may be similar to coupons in some ways, such as a "buy one item, get the second one for 50% off." Promotions may also include cross-selling advertising (e.g., buy a carpet cleaner today and get $5 off of detergent), up-selling, or the like.

In an embodiment, to execute the sales action, the marketing module 408 is to serve a coupon, an advertisement, or a promotion to the person. The coupon, advertisement, or promotion may be based on what the marketing module 408 determines as a possible reason why a person discarded an object. For example, if the person discarded the object after looking at the price tag, a coupon may be served. If the person discarded the object after reading a list of ingredients, then an alternative product, such as an allergen-friendly product, may be advertised. As another example, if the user used their phone to scan the bar code or some other portion of the product, it may be because they are looking for reviews or a better price. This action by the person may prompt a coupon, advertisement, or promotion, or combinations to entice the person to buy.

In a further embodiment, to serve the coupon, the advertisement, or the promotion, the marketing module 408 is to transmit the coupon, advertisement, or promotion to a user device of the person. The user device may be any type of compute device, including a laptop, desktop, smartphone, personal digital assistant, wearable device, hybrid device, tablet device, or the like. In a further embodiment, the user device comprises a wearable device. The wearable device may be a smartwatch, smartglasses, an e-textile, or other wearable device.

Figure 5:
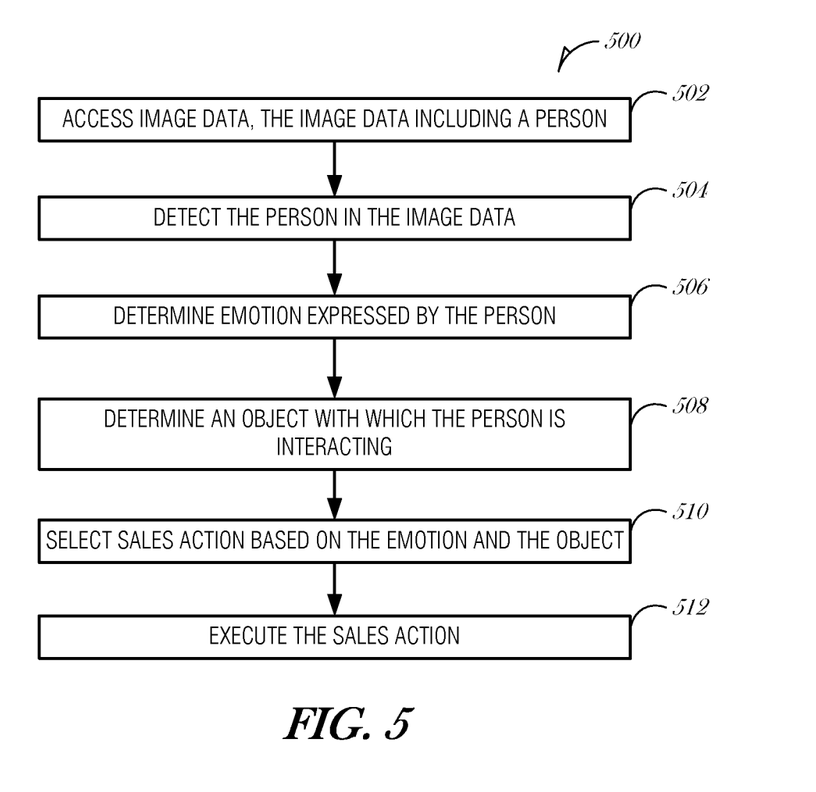
FIG. 5 is a flowchart illustrating a method of analyzing emotional engagement of people while shopping, according to an embodiment.

FIG. 5 is a flowchart illustrating a method 500 of analyzing emotional engagement of people while shopping, according to an embodiment. At block 502, image data from an electronic data storage is accessed at a computer-implemented user tracking system, the image data including a person in a retail environment. At block 504, the person in the image data is detected. At block 506, an emotion expressed by the person is determined. At block 508, an object with which the person is interacting is determined. At block 510, a sales action is selected based on the emotion and the object. At block 512, the sales action is executed.

In an embodiment, the image data is from multiple images of the person. In a further embodiment, the multiple images are from multiple angles. In a further embodiment, the multiple images are from a sequence of images during an interaction between the person and the object.

In an embodiment, detecting the person in the image data comprises using an edge detection technique to identify a face and using a person detection technique to detect the person in the image.

In an embodiment, determining the emotion expressed by the person comprises analyzing the image data of the person and identifying a facial expression and identifying the emotion expressed based on the facial expression.

In an embodiment, determining the emotion expressed by the person comprises analyzing the image data of the person and identifying a body posture and identifying the emotion expressed based on the body posture.

In an embodiment, the method 500 includes receiving data related to the gaze characteristics of the person and using the gaze characteristics to determine a gaze target invoking the emotion expressed by the person. In a further embodiment, the data related to the gaze characteristics includes gaze tracking data received from an infrared camera.

In an embodiment, the method 500 includes receiving audio data of the person and using the audio data to determine the emotion expressed by the person. In a further embodiment, the audio data includes an utterance of the person.

In an embodiment, the method 500 includes receiving data from a user device of the person and using the data from the user device to determine the emotion expressed by the person. In a further embodiment, the data from the user device comprises heart rate data of the person. In a further embodiment, the data from the user device comprises skin temperature data of the person. In a further embodiment, the data from the user device comprises blood pressure data of the person.

In an embodiment, determining the object with which the person is interacting comprises using an edge detection technique to obtain a silhouette of the object and matching the silhouette of the object with an object template.

In an embodiment, determining the object with which the person is interacting comprises using a text recognition technique to recognize text on the object and performing a lookup in a text dictionary to identify the object based on the text.

In an embodiment, selecting the sales action based on the emotion and the object comprises determining that the person discarded the object and identifying an incentive for the person based on the object. In a further embodiment, the incentive is one of a coupon or a promotion.

In an embodiment, executing the sales action comprises serving a coupon, an advertisement, or a promotion to the person. In a further embodiment, serving the coupon, the advertisement, or the promotion comprises transmitting the coupon, advertisement, or promotion to a user device of the person. In a further embodiment, the user device comprises a wearable device.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
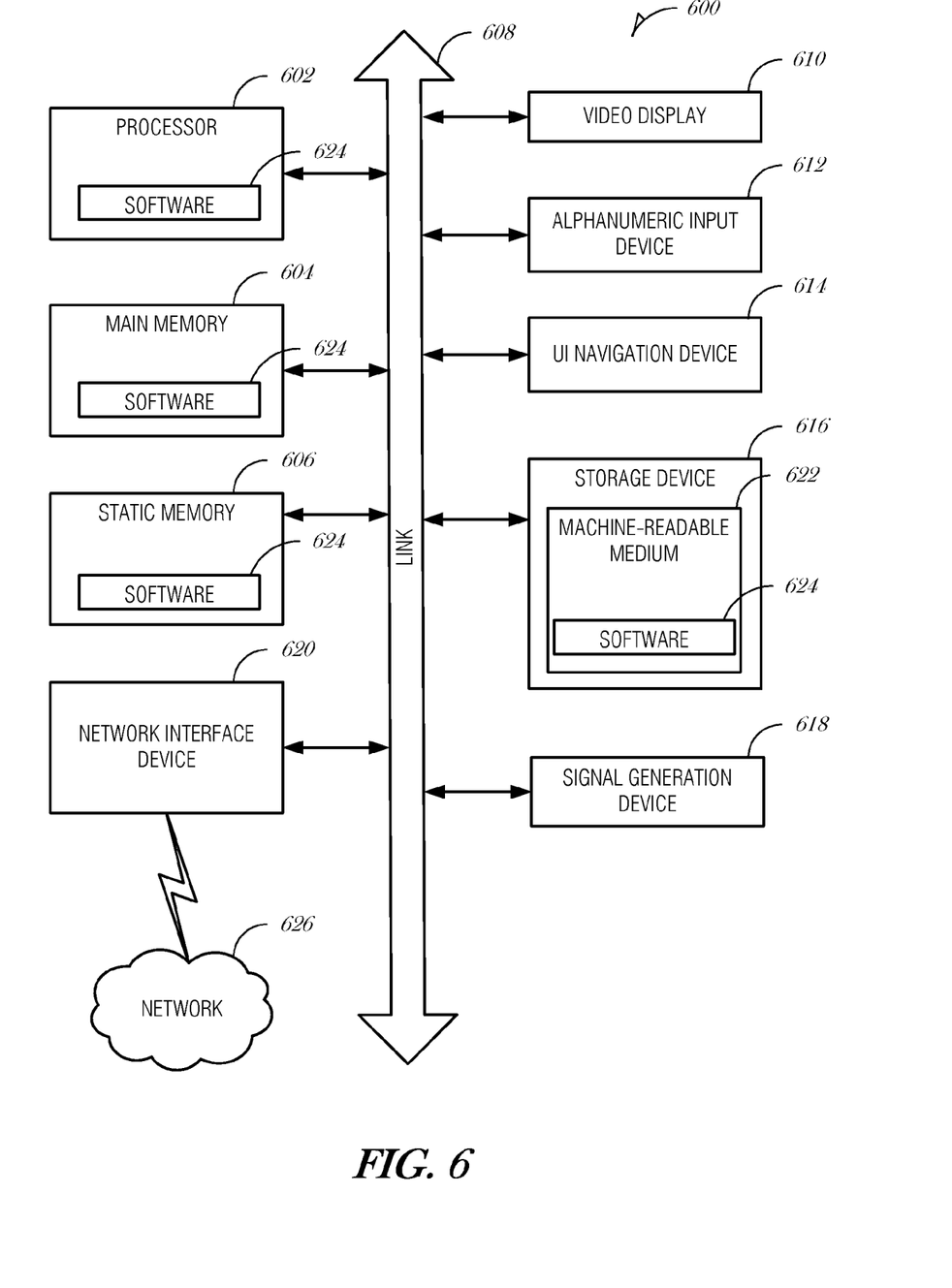
FIG. 6 is a block diagram illustrating a machine in the example form of a computer system, within which a set or sequence of instructions may be executed to cause the machine to perform any one of the methodologies discussed herein, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for tracking and analyzing emotional engagement of people while shopping (such as a device, apparatus, or machine) comprising: an image processing module to: access image data from an electronic data storage, the image data including a person in a retail environment; and detect the person in the image data; an emotion detection module to determine an emotion expressed by the person; an object detection module to determine an object with which the person is interacting; and a marketing module to: select a sales action based on the emotion and the object; and execute the sales action.

In Example 2, the subject matter of Example 1 may include, wherein the image data is from multiple images of the person.

In Example 3, the subject matter of any one of Examples 1 to 2 may include, wherein the multiple images are from multiple angles.

In Example 4, the subject matter of any one of Examples 1 to 3 may include, wherein the multiple images are from a sequence of images during an interaction between the person and the object.

In Example 5, the subject matter of any one of Examples 1 to 4 may include, wherein to detect the person in the image data, the image processing module is to: use an edge detection technique to identify a face; and use a person detection technique to detect the person in the image.

In Example 6, the subject matter of any one of Examples 1 to 5 may include, wherein to determine the emotion expressed by the person, the emotion detection module is to: analyze the image data of the person and identify a facial expression; and identify the emotion expressed based on the facial expression.

In Example 7, the subject matter of any one of Examples 1 to 6 may include, wherein to determine the emotion expressed by the person, the emotion detection module is to: analyze the image data of the person and identify a body posture; and identify the emotion expressed based on the body posture.

In Example 8, the subject matter of any one of Examples 1 to 7 may include, wherein the emotion detection module is to: receive data related to the gaze characteristics of the person; and use the gaze characteristics to determine a gaze target invoking the emotion expressed by the person.

In Example 9, the subject matter of any one of Examples 1 to 8 may include, wherein the data related to the gaze characteristics includes gaze tracking data received from an infrared camera.

In Example 10, the subject matter of any one of Examples 1 to 9 may include, wherein the emotion detection module is to: receive audio data of the person; and use the audio data to determine the emotion expressed by the person.

In Example 11, the subject matter of any one of Examples 1 to 10 may include, wherein the audio data includes an utterance of the person.

In Example 12, the subject matter of any one of Examples 1 to 11 may include, wherein the emotion detection module is to: receive data from a user device of the person; and use the data from the user device to determine the emotion expressed by the person.

In Example 13, the subject matter of any one of Examples 1 to 12 may include, wherein the data from the user device comprises heart rate data of the person.

In Example 14, the subject matter of any one of Examples 1 to 13 may include, wherein the data from the user device comprises skin temperature data of the person.

In Example 15, the subject matter of any one of Examples 1 to 14 may include, wherein the data from the user device comprises blood pressure data of the person.

In Example 16, the subject matter of any one of Examples 1 to 15 may include, wherein to determine the object with which the person is interacting, the object detection module is to: use an edge detection technique to obtain a silhouette of the object; and match the silhouette of the object with an object template.

In Example 17, the subject matter of any one of Examples 1 to 16 may include, wherein to determine the object with which the person is interacting, the object detection module is to: use a text recognition technique to recognize text on the object; and perform a lookup in a text dictionary to identify the object based on the text.

In Example 18, the subject matter of any one of Examples 1 to 17 may include, wherein to select the sales action based on the emotion and the object, the marketing module is to: determine that the person discarded the object; and identify an incentive for the person based on the object.

In Example 19, the subject matter of any one of Examples 1 to 18 may include, wherein the incentive is one of a coupon or a promotion.

In Example 20, the subject matter of any one of Examples 1 to 19 may include, wherein to execute the sales action, the marketing module is to serve a coupon, an advertisement, or a promotion to the person.

In Example 21, the subject matter of any one of Examples 1 to 20 may include, wherein to serve the coupon, the advertisement, or the promotion, the marketing module is to transmit the coupon, advertisement, or promotion to a user device of the person.

In Example 22, the subject matter of any one of Examples 1 to 21 may include, wherein the user device comprises a wearable device.

Example 23 includes subject matter for tracking and analyzing emotional engagement of people while shopping (such as a method, means for performing acts, machine readable medium including instructions that when performed by a machine cause the machine to performs acts, or an apparatus to perform) comprising: accessing, at a computer-implemented user tracking system, image data from an electronic data storage, the image data including a person in a retail environment; detecting the person in the image data; determining an emotion expressed by the person; determining an object with which the person is interacting; selecting a sales action based on the emotion and the object; and executing the sales action.

In Example 24, the subject matter of Example 23 may include, wherein the image data is from multiple images of the person.

In Example 25, the subject matter of any one of Examples 23 to 24 may include, wherein the multiple images are from multiple angles.

In Example 26, the subject matter of any one of Examples 23 to 25 may include, wherein the multiple images are from a sequence of images during an interaction between the person and the object.

In Example 27, the subject matter of any one of Examples 23 to 26 may include, wherein detecting the person in the image data comprises: using an edge detection technique to identify a face; and using a person detection technique to detect the person in the image.

In Example 28, the subject matter of any one of Examples 23 to 27 may include, wherein determining the emotion expressed by the person comprises: analyzing the image data of the person and identifying a facial expression; and identifying the emotion expressed based on the facial expression.

In Example 29, the subject matter of any one of Examples 23 to 28 may include, wherein determining the emotion expressed by the person comprises: analyzing the image data of the person and identifying a body posture; and identifying the emotion expressed based on the body posture.

In Example 30, the subject matter of any one of Examples 23 to 29 may include, receiving data related to the gaze characteristics of the person; and using the gaze characteristics to determine a gaze target invoking the emotion expressed by the person.

In Example 31, the subject matter of any one of Examples 23 to 30 may include, wherein the data related to the gaze characteristics includes gaze tracking data received from an infrared camera.

In Example 32, the subject matter of any one of Examples 23 to 31 may include, receiving audio data of the person; and using the audio data to determine the emotion expressed by the person.

In Example 33, the subject matter of any one of Examples 23 to 32 may include, wherein the audio data includes an utterance of the person.

In Example 34, the subject matter of any one of Examples 23 to 33 may include, receiving data from a user device of the person; and using the data from the user device to determine the emotion expressed by the person.

In Example 35, the subject matter of any one of Examples 23 to 34 may include, wherein the data from the user device comprises heart rate data of the person.

In Example 36, the subject matter of any one of Examples 23 to 35 may include, wherein the data from the user device comprises skin temperature data of the person.

In Example 37, the subject matter of any one of Examples 23 to 36 may include, wherein the data from the user device comprises blood pressure data of the person.

In Example 38, the subject matter of any one of Examples 23 to 37 may include, wherein determining the object with which the person is interacting comprises: using an edge detection technique to obtain a silhouette of the object; and matching the silhouette of the object with an object template.

In Example 39, the subject matter of any one of Examples 23 to 38 may include, wherein determining the object with which the person is interacting comprises: using a text recognition technique to recognize text on the object; and performing a lookup in a text dictionary to identify the object based on the text.

In Example 40, the subject matter of any one of Examples 23 to 39 may include, wherein selecting the sales action based on the emotion and the object comprises: determining that the person discarded the object; and identifying an incentive for the person based on the object.

In Example 41, the subject matter of any one of Examples 23 to 40 may include, wherein the incentive is one of a coupon or a promotion.

In Example 42, the subject matter of any one of Examples 23 to 41 may include, wherein executing the sales action comprises serving a coupon, an advertisement, or a promotion to the person.

In Example 43, the subject matter of any one of Examples 23 to 42 may include, wherein serving the coupon, the advertisement, or the promotion comprises transmitting the coupon, advertisement, or promotion to a user device of the person.

In Example 44, the subject matter of any one of Examples 23 to 43 may include, wherein the user device comprises a wearable device.

Example 45 includes at least one machine-readable medium including instructions, which when executed by a machine, cause the machine to perform operations of any of the Examples 23-44.

Example 46 includes an apparatus comprising means for performing any of the Examples 23-44.

Example 47 includes subject matter for tracking and analyzing emotional engagement of people while shopping (such as a device, apparatus, or machine) comprising: means for accessing, at a computer-implemented user tracking system, image data from an electronic data storage, the image data including a person in a retail environment; means for detecting the person in the image data; means for determining an emotion expressed by the person; means for determining an object with which the person is interacting; means for selecting a sales action based on the emotion and the object; and means for executing the sales action.

In Example 48, the subject matter of Example 47 may include, wherein the image data is from multiple images of the person.

In Example 49, the subject matter of any one of Examples 47 to 48 may include, wherein the multiple images are from multiple angles.

In Example 50, the subject matter of any one of Examples 47 to 49 may include, wherein the multiple images are from a sequence of images during an interaction between the person and the object.

In Example 51, the subject matter of any one of Examples 47 to 50 may include, wherein the means for detecting the person in the image data comprise: means for using an edge detection technique to identify a face; and means for using a person detection technique to detect the person in the image.

In Example 52, the subject matter of any one of Examples 47 to 51 may include, wherein the means for determining the emotion expressed by the person comprise: means for analyzing the image data of the person and identifying a facial expression; and means for identifying the emotion expressed based on the facial expression.

In Example 53, the subject matter of any one of Examples 47 to 52 may include, wherein the means for determining the emotion expressed by the person comprise: means for analyzing the image data of the person and identifying a body posture; and means for identifying the emotion expressed based on the body posture.

In Example 54, the subject matter of any one of Examples 47 to 53 may include, means for receiving data related to the gaze characteristics of the person; and means for using the gaze characteristics to determine a gaze target invoking the emotion expressed by the person.

In Example 55, the subject matter of any one of Examples 47 to 54 may include, wherein the data related to the gaze characteristics includes gaze tracking data received from an infrared camera.

In Example 56, the subject matter of any one of Examples 47 to 55 may include, means for receiving audio data of the person; and means for using the audio data to determine the emotion expressed by the person.

In Example 57, the subject matter of any one of Examples 47 to 56 may include, wherein the audio data includes an utterance of the person.

In Example 58, the subject matter of any one of Examples 47 to 57 may include, means for receiving data from a user device of the person; and means for using the data from the user device to determine the emotion expressed by the person.

In Example 59, the subject matter of any one of Examples 47 to 58 may include, wherein the data from the user device comprises heart rate data of the person.

In Example 60, the subject matter of any one of Examples 47 to 59 may include, wherein the data from the user device comprises skin temperature data of the person.

In Example 61, the subject matter of any one of Examples 47 to 60 may include, wherein the data from the user device comprises blood pressure data of the person.

In Example 62, the subject matter of any one of Examples 47 to 61 may include, wherein the means for determining the object with which the person is interacting comprise: means for using an edge detection technique to obtain a silhouette of the object; and means for matching the silhouette of the object with an object template.

In Example 63, the subject matter of any one of Examples 47 to 62 may include, wherein the means for determining the object with which the person is interacting comprise: means for using a text recognition technique to recognize text on the object; and means for performing a lookup in a text dictionary to identify the object based on the text.

In Example 64, the subject matter of any one of Examples 47 to 63 may include, wherein the means for selecting the sales action based on the emotion and the object comprise: means for determining that the person discarded the object; and means for identifying an incentive for the person based on the object.

In Example 65, the subject matter of any one of Examples 47 to 64 may include, wherein the incentive is one of a coupon or a promotion.

In Example 66, the subject matter of any one of Examples 47 to 65 may include, wherein the means for executing the sales action comprise means for serving a coupon, an advertisement, or a promotion to the person.

In Example 67, the subject matter of any one of Examples 47 to 66 may include, wherein the means for serving the coupon, the advertisement, or the promotion comprise means for transmitting the coupon, advertisement, or promotion to a user device of the person.

In Example 68, the subject matter of any one of Examples 47 to 67 may include, wherein the user device comprises a wearable device.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for tracking and analyzing emotional engagement of people while shopping, the system comprising:
   a processor;
   a non-transitory storage medium comprising instructions which, when executed by the processor, cause the system to:
      use a camera to record image data, the image data including a retail environment;
      in response to the recording, use the processor to detect a person in the image data;
      analyze the image data to determine that the person read an ingredient list on an object with which the person is interacting;
      determine a negative emotion expressed by the person based on the person discarding the object after reading the ingredient list;
      select a sales action based on the emotion and the object, the sales action comprising an offer for an alternative object with a different ingredient list; and
      in response to the selecting, use a device that the person is wearing or carrying to execute the selected sales action.

2. The system of claim 1, wherein the image data is from multiple images of the person.

3. The system of claim 1, wherein to detect the person in the image data, the instructions, when executed by the processor, cause the system to:
   use an edge detection technique to identify a face; and
   use a person detection technique to detect the person in the image.

4. The system of claim 1, wherein to determine the emotion expressed by the person, the instructions, when executed by the processor, cause the system to:
   analyze the image data of the person and identify a facial expression; and
   identify the emotion expressed based on the facial expression.

5. The system of claim 1, wherein to determine the emotion expressed by the person, the instructions, when executed by the processor, cause the system to:
   analyze the image data of the person and identify a body posture; and
   identify the emotion expressed based on the body posture.

6. The system of claim 1, wherein the instructions, when executed by the processor, cause the system to:
   receive data related to the gaze characteristics of the person; and
   use the gaze characteristics to determine a gaze target invoking the emotion expressed by the person.

7. The system of claim 6, wherein the data related to the gaze characteristics includes gaze tracking data received from an infrared camera.

8. The system of claim 1, wherein the instructions, when executed by the processor, cause the system to:
   receive audio data of the person; and
   use the audio data to determine the emotion expressed by the person.

9. The system of claim 1, wherein the instructions, when executed by the processor, cause the system to:
   receive data from a user device of the person; and
   use the data from the user device to determine the emotion expressed by the person.

10. The system of claim 9, wherein the data from the user device comprises heart rate data of the person.

11. At least one non-transitory machine-readable medium including instructions, which when executed by a processor of a machine, cause the machine to:
    use a camera to record image data, the image data including a retail environment;
    in response to the recording, use the processor to detect a person in the image data;
    analyze the image data to determine that the person read an ingredient list on an object with which the person is interacting;
    determine a negative emotion expressed by the person based on the person discarding the object after reading the ingredient list;
    select a sales action based on the emotion and the object, the sales action comprising an offer for an alternative object with a different ingredient list; and
    in response to the selecting, use a device that the person is wearing or carrying to execute the selected sales action.

12. The at least one machine-readable medium of claim 11, wherein the instructions to detect the person in the image data comprise instructions to:
    use an edge detection technique to identify a face; and
    use a person detection technique to detect the person in the image.

13. The at least one machine-readable medium of claim 11, wherein the instructions to determine the emotion expressed by the person comprise instructions to:
    analyze the image data of the person and identifying a facial expression; and
    identify the emotion expressed based on the facial expression.

14. The at least one machine-readable medium of claim 11, wherein the instructions to determine the emotion expressed by the person comprise instructions to:
    analyze the image data of the person and identifying a body posture; and
    identify the emotion expressed based on the body posture.

15. The at least one machine-readable medium of claim 11, further comprising instructions to:
    receive data related to the gaze characteristics of the person; and
    use the gaze characteristics to determine a gaze target invoking the emotion expressed by the person.

16. The at least one machine-readable medium of claim 15, wherein the data related to the gaze characteristics includes gaze tracking data received from an infrared camera.

17. The at least one machine-readable medium of claim 11, further comprising instructions to:
    receive audio data of the person; and
    use the audio data to determine the emotion expressed by the person.

18. The at least one machine-readable medium of claim 11, further comprising instructions to:
    receive data from a user device of the person; and
    use the data from the user device to determine the emotion expressed by the person.

19. The at least one machine-readable medium of claim 18, wherein the data from the user device comprises heart rate data of the person.

20. The at least one machine-readable medium of claim 18, wherein the data from the user device comprises skin temperature data of the person.

21. The at least one machine-readable medium of claim 11, wherein the instructions to select the sales action based on the emotion and the object comprise instructions to identify an incentive for the person based on the object.

22. The at least one machine-readable medium of claim 11, wherein the instructions to execute the sales action comprise instructions to serve a coupon, an advertisement, or a promotion to the person.

23. A method of tracking and analyzing emotional engagement of people while shopping, the method comprising:

using a camera to record image data, the image data including a retail environment;

in response to the recording, using a processor to detect a person in the image data;

analyzing the image data to determine that the person read an ingredient list on an object with which the person is interacting;

determining a negative emotion expressed by the person based on the person discarding the object after reading the ingredient list;

selecting a sales action based on the emotion and the object, the sales action comprising an offer for an alternative object with a different ingredient list; and     in response to the selecting, using a device that the person is wearing or carrying to execute the selected sales action.

24. The method of claim 23, wherein determining the emotion expressed by the person comprises:

analyzing the image data of the person and identifying a facial expression; and     identifying the emotion expressed based on the facial expression.

25. The method of claim 23, wherein selecting the sales action based on the emotion and the object comprises identifying an incentive for the person based on the object.

* * * * *